ates Patent [19]

United States Patent [19]
Grill et al.

[11] Patent Number: 4,944,928
[45] Date of Patent: Jul. 31, 1990

[54] PROCESS FOR PRODUCING PURE MAGNESIUM OXIDE

[75] Inventors: Michael Grill; Gerhard Graf, both of Leoben, Austria

[73] Assignee: Veitscher Magnestiwerke-Actien-Gesellschaft, Vienna, Austria

[21] Appl. No.: 342,503
[22] PCT Filed: Jun. 23, 1988
[86] PCT No.: PCT/AT88/00048
§ 371 Date: Feb. 27, 1989
§ 102(e) Date: Feb. 27, 1989
[87] PCT Pub. No.: WO88/10236
PCT Pub. Date: Dec. 29, 1988

[30] Foreign Application Priority Data

Jun. 26, 1987 [AT] Austria .................. 1621/87

[51] Int. Cl.$^5$ .................. C01F 5/06; C01F 5/10
[52] U.S. Cl. .................. 423/161; 423/155; 423/164; 423/497; 423/639
[58] Field of Search .............. 423/164, 155, 161, 497, 423/639

[56] References Cited

U.S. PATENT DOCUMENTS

| | | |
|---|---|---|
| 2,398,493 | 4/1946 | Butt et al. |
| 2,549,798 | 4/1951 | Gee et al. |
| 3,980,753 | 9/1976 | Grill et al. ............ 423/164 |
| 4,100,254 | 7/1978 | Grohmann et al. ............ 423/164 |
| 4,200,618 | 4/1980 | Pitts |
| 4,255,399 | 3/1981 | Grill et al. ............ 423/164 |

FOREIGN PATENT DOCUMENTS

| | | |
|---|---|---|
| 2137573 | 2/1973 | Fed. Rep. of Germany. |
| 2107844 | 12/1975 | Fed. Rep. of Germany. |
| 2915129 | 11/1979 | Fed. Rep. of Germany. |
| 81088 | 1/1983 | Romania. |
| 2068348 | 8/1981 | United Kingdom. |

OTHER PUBLICATIONS

Chemical Abstracts, vol. 82, No. 142242x, p. 133, Jun. 2, 1975.
Hackh's Chemical Dictionary, Fourth Edition, (1969), McGraw-Hill, Inc., p. 605.

Primary Examiner—Robert L. Stoll
Assistant Examiner—Wayne A. Langel
Attorney, Agent, or Firm—Sughrue, Mion, Zinn, Macpeak & Seas

[57] ABSTRACT

A process for the preparation of pure magnesium oxide, especially suitable for the preparation of refractory products, from magnesium silicate and magnesium hydrosilicate materials such as olivine, serpentine, garnierite, or the like, the starting material being decomposed (digested) with hydrochloric acid, the residues being separated from the decomposition slurry and the sesquioxides to be regarded as contaminants and other contaminants being precipitated from the crude brine thus obtained by the addition of crude serpentine as a pH increasing substance, the precipitates being separated and the magnesium chloride solution thus obtained being subjected to thermal decomposition, particularly by spray calcination, whereby magnesium oxide is obtained and hydrogen chloride is recovered.

11 Claims, No Drawings

PROCESS FOR PRODUCING PURE MAGNESIUM OXIDE

The invention relates to a process for the preparation of pure magnesium oxide, especially suitable for the preparation of refractory products, from magnesium silicate and magnesium hydrosilicate materials such as olivine, serpentine, garnierite, or the like, the starting material being decomposed with hydrochloric acid, the residue being separated from the decomposition slurry and the sesquioxides to be regarded as contaminants, and other contaminants, being precipitated from the crude brine thus obtained by the addition of a pH-increasing substance, the precipitates being separated and the magnesium chloride solution thus obtained being subjected to thermal decomposition, particularly by spray-calcining, whereby magnesium oxide is obtained and hydrogen chloride is recovered.

The following are suitable as starting materials for this process: so-called ultra-mafitic rocks of the peridotite, dunite, harzburgite group and the like, the transformation products thereof, usually known as serpentine or serpentinite, weathered products of said rocks, half-products and byproducts arising during the processing thereof, and industrial byproducts and waste products of similar composition, as long as they have an MgO content of at least 15% by weight. These materials are called hereinafter with the term "serpentine" or "crude serpentine".

In known processes of this kind the pH-increasing substance used to precipitate sesquioxides is generally magnesium oxide, mostly in the form of caustic calcined magnesia. However, the use of such a precipitant has disadvantages. The serpentines, and similar starting materials, usually have a high content of iron and other sesquioxide contaminants and large additions of precipitant are needed. Since all kinds of caustic magnesia are costly, for the reason that they can be prepared only with a considerable expenditure especially of thermal energy, the use of caustic magnesia as a precipitating agent imposes a heavy economic burden. If pure magnesium oxide obtained as the end product of the process is used as precipitating agent, depending upon the amount of iron and other sesquioxide contaminants contained in the crude serpentine or the like starting material, up to about 30% by weight of the obtained magnesium oxide must be circulated internally, and this is economically unacceptable.

It is known from U.S. Pat. 2,398,493 to add calcined serpentine to a magnesium chloride slurry produced by decomposition of serpentine with hydrochloric acid as precipitating agent for contaminants. However, this method has the disadvantage that the silicic acid portion of the serpentine is converted, by the calcination, into a form which is more easily dissolved or suspended in the magnesium chloride slurry. The result thereof is that during the subsequent separation of the residues or precipitates a larger proportion of silicic acid remains in the magnesium chloride brine and the $SiO_2$ content in the end product is therefore higher. In addition this increased amount of amorphous or dissolved silicic acid in the magnesium chloride slurry means that the $Fe(OH)_3$ and other hydroxide precipitates obtained during subsequent precipitation are slimy and therefore difficult to filter. Finally, a considerable amount of energy is also required to calcine serpentine.

It is the object of the invention to provide a process of the type mentioned at the beginning hereof in which the disadvantages mentioned are eliminated, which process permits economical operation, and which makes it possible to obtain easily filtered hydroxy precipitates.

The process according to the invention is characterized in that finely ground crude serpentine having a grain size of between 0 and 1mm, preferably between 0 and 0,1mm, is used as the pH-increasing substance for precipitating oxides of iron and of aluminum.

Said precipitating agent ensures complete precipitation of aluminum and extensive precipitation of trivalent iron in the pH range below 5.

If bivalent iron is present in the starting material and if it also is to be removed, according to a special examide of an embodiment of the process according to the invention for transforming the bivalent iron into precipitable trivalent iron, it is possible to introduce air and/or some other oxidizing agent, such as chlorine or hydrogen peroxide $H_2O_2$, into the crude brine under intensive stirring of the latter. If bivalent manganese is present in the starting material and should be removed, it may be transformed into quadrivalent manganese by oxidation. This may be carried out in the course of an oxidizing treatment carried out for the purpose of transforming bivalent iron into trivalent iron; it is also possible to carry out an oxidizing treatment additionally to the oxidizing treatment of iron in order to oxidize manganese.

The precipitation occuring in the process according to the invention may be carried out continuously or intermittently.

One of the advantages of the process according to the invention is that the starting material need merely be broken up; no other pre-treatment, especially calcining is needed.

Details of the precipitation procedure are as follows: after the crude serpentine has been added to the crude brine obtained by separating the undissolved decomposition residue, the pH value of the crude brine initially increases rapidly to about 4, whereby oxidizing of the still bivalent iron in the acid crude brine into the trivalent form of iron is encouraged; this, in turn, brings about relatively rapid precipitation of contaminants at the beginning of the whole procedure. Subsequently, as a result of oxidizing $Fe^{++}$ to $Fe^{+++}$, the pH value falls slightly and then rises again. This increase in pH value is steady and slow, the pH value remaining below 5.

It is desirable for the crude serpentine used as precipitating agent to be added to the crude brine in an amount between 1 ½ and 2½ times the stoichiometrical requirement. In this connection, the stoichiometrical requirement is regarded as the amount of crude serpentine the MgO content of which is sufficient to neutralize the acidity of the crude brine; the acidity of the crude brine is determined by the amount of free HCl present in the acid crude brine and by the amount of crude brine in the oxidic contaminants accessible to precipitation. In this connection, both the oxidic contaminants which were present in the crude brine before the addition of the crude serpentine, acting as precipitating agent and the oxidic contaminants which were introduced into the crude brine with the crude serpentine acting as the precipitating agent, must be taken into account.

It is also advantageous to maintain the temperature of the crude brine at above 80° C for the precipitation of contaminants effected by the addition of crude serpentine to the crude brine.

Another embodiment of the process according to the invention is characterized in that, upon completion of the precipitation of contaminants effected by the addition of crude serpentine to the crude brine, any iron, manganese, nickel still present in the brine, and any other sesquioxide contaminants remaining in the brine, are precipitated in known manner by the addition of pH-increasing substances known for that purpose, preferably caustic magnesia or flue dust arising during the calcination of magnesite.

A variant of this embodiment is characterized in that the precipitation carried out be adding crude serpentine to the crude brine at a pH value of below 5 is continued only until most of the iron and aluminum hydroxide have been precipitated. Thereafter, the precipitation procedure is rapidly completed by increasing the pH value to between 6 and 7 means of a small amount of caustic magnesia. In this connection, the precipitation effected, for example, by the addition of crude serpentine, may last for about four hours, while the following precipitation, in which the pH value is increased by the addition of caustic magnesia, may last for another two hours, for example.

The invention will now be explained in greater detail in the following examples.

EXAMPLE 1

1730kg of crude serpentine containing 728kg of MgO, 122kg of $Fe_2O_3$, 4.66kg of NiO and 5kg of CaO were decomposed with 7330kg of hydrochloric acid containing 1330kg of $Cl-$. About 710kg of undissolved residue was separated from the decomposition slurry and 8350kg of acid crude brine was thus obtained. This crude brine containing 713kg of MgO, 113kg of $Fe_2O_3$, 4.6kg of NiO, 1330kg of $Cl-$ and 1.8kg of CaO, was mixed with 647kg of crude serpentine with a grain size of 0 to 0.1mm as the precipitating agent and air was introduced, under intensive stirring, into the crude brine, the temperature of which was maintained at above 80° C. The pH value increased to about 4 and precipitation was completed in a few hours. The precipitated material together with the undissolved portion of the crude serpentine added as the precipitating agent was separated resulting in a filter cake weighing 823kg. The filter cake contained 225kg of MgO, 157kg of $Fe_2O_3$, 1kg of NiO and 1.4kg of CaO. The remaining pure brine contained 748kg of MgO, 0.08kg of $Fe_2O_3$, 5.15kg of NiO, 1324kg of Cl and 3kg of CaO.

EXAMPLE 2

1585kg of crude serpentine containing 667kg of MgO, 112kg of $Fe_2O_3$, 4.27kg of NiO and 4.59kg of CaO was decomposed with 6746kg of hydrochloric acid containing 1220kg of $Cl-$. About 625kg of undissolved residue was separated from the decomposition slurry and 7706kg of acid crude brine was thus obtained. This crude brine containing 643kg of MgO, 104kg of $Fe_2O_3$, 4.20kg of NiO, 1220kg of $Cl-$ and 1.8kg of CaO was mixed with 597kg of crude serpentine with a grain size of 0 to 0.1mm as the precipitating agent and air was introduced, under intensive stirring, into the crude brine, the temperature of which was maintained at above 80°C. The pH value increased to about 4 and after 4 hours of reaction was quickly increased to pH 6.8 by the addition of 98kg of flue dust. The flue dust contained 82kg of MgO, 5.20kg of $Fe_2O_3$ and 2.60kg of CaO. This allowed the precipitation to be completed within 1 hour. The precipitated material was separated together with the undissolved portions of crude serpentine and caustic magnesia, resulting in a filter cake weighing 830kg and containing 255kg of MgO, 145kg of $Fe_2O_3$, 1.85kg of CaO and 4.27kg of NiO. The remaining pure brine (7571kg) contained 721kg of MgO, $<0.01$kg of $Fe_2O_3$, 4.25kg of CaO, $<0.01$kg of NiO and 1210kg of $Cl-$.

We claim:

1. A process for the preparation of pure magnesium oxide from starting materials selected from the group consisting of magnesium silicate and magnesium hydrosilicate materials comprising dissolving the starting material in hydrochloric acid to form a slurry comprising crude brine and residues, separating the residues from the slurry, adding finely ground crude serpentine having a grain size of between 0 and 1mm to the brine as the pH increasing substance for precipitating oxides of iron and aluminum, separating the precipitates and thermally decomposing the magnesium chloride solution thus obtained to obtain magnesium oxide and hydrogen chloride.

2. A process according to claim 1, wherein bivalent iron present in the starting material is converted into precipitable trivalent iron by the introduction of air and/or another oxidizing agent into the crude brine under intensive stirring.

3. A process according to either claim 1 or 2, wherein the crude brine is held at a temperature above 80° C. during precipitation of contaminants affected by the addition of crude serpentine to the crude brine.

4. A process according to either claim 1 or 2, wherein the crude serpentine used as precipitating agent is added to the crude brine in an amount between 1½ and 2½ times the stiochiometric requirement.

5. A process according to either claim 1 or 2, wherein upon completion of the precipitation of contaminants affected by the addition of crude serpentine to the crude brine, any iron, manganese, nickel or other sesquioxide contaminants remaining in the brine are precipitated in a known manner by the addition of pH increasing substances known for that purpose.

6. A process according to either claim 1 or 2, wherein the precipitation carried out by the addition of crude serpentine to crude brine at a pH value of below 5, is continued only until most of the iron and aluminum hydroxide has been precipitated, the precipitation process then being rapidly completed by increasing the pH value to between 6 and 7 by means of caustic magnesia.

7. A process according to either claim 1 or 2, wherein said finely ground crude serpentine has a grain size of between 0 and 0.1mm.

8. A process according to claim 5, wherein the pH increasing substance added to the crude brine to precipitate iron, manganese, nickel or other sesquioxide contaminants remaining in the brine is selected from the group consisting of caustic magnesia or flue dust resulting from calcining magnesia.

9. A process according to either claim 1 or 2, wherein the crude serpentine used as precipitating agent is added to the crude brine in an amount between 1½ and 2½ times the stoichiometric requirement, and wherein, upon completion of the precipitation of contaminants affected by the addition of crude serpentine to the crude brine, any iron, manganese, nickel or other sesquioxide contaminants remaining in the brine are precipitated in a known manner by the addition of pH increasing substances known for that purpose.

10. A process according to either claim 1 or 2, wherein the crude serpentine used as precipitating agent is added to the crude brine in an amount between 1½ and 2½ times the stoichiometric requirement, and wherein the precipitation carried out by the addition of crude serpentine to crude brine at a pH value of below 5 is continued only until most of the iron and aluminum hydroxide has been precipitated, the precipitation process then being rapidly completed by increasing the pH value to between 6 and 7 by means of caustic magnesia.

11. A process for the preparation of refractory product grade pure magnesium oxide from starting materials selected from the group consisting of magnesium silicate and magnesium hydrosilicate materials comprising dissolving the starting material in hydrochloric acid to form a slurry comprising crude brine and residues, separating the residues from the slurry, adding finely ground crude serpentine having a grain size of between 0 and 1mm to the brine as the pH increasing substance for precipitating oxides of iron and aluminum, separating the precipitates and thermally decomposing the magnesium chloride solution thus obtained to obtain said pure magnesium oxide and hydrogen chloride.

* * * * *